(12) United States Patent
Spence et al.

(10) Patent No.: US 8,151,273 B2
(45) Date of Patent: Apr. 3, 2012

(54) ENVIRONMENT WIDE CONFIGURATION SYSTEM

(75) Inventors: Jeanine E. Spence, Kenmore, WA (US);
Joseph W. Hallock, Renton, WA (US);
Eric C. Kool-Brown, Seattle, WA (US);
Jeremy D. Brown, Woodinville, WA (US); Christer Garbis, Kirkland, WA (US); Michael W. Jackson, Redmond, WA (US); Edward K. Tremblay, Bellevue, WA (US); Dmitry Sonkin, Redmond, WA (US); Marc Greisen, Snohomish, WA (US); Kanchuki Sarma, Kirkland, WA (US); Michael D. Lubrecht, Carnation, WA (US); Gary J. Purchase, Bothell, WA (US); Kenneth P. Coleman, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 886 days.

(21) Appl. No.: 12/199,847

(22) Filed: Aug. 28, 2008

(65) Prior Publication Data

US 2010/0058105 A1    Mar. 4, 2010

(51) Int. Cl.
*G06F 9/46* (2006.01)
(52) U.S. Cl. ........................ 718/106; 718/100
(58) Field of Classification Search .................. None
See application file for complete search history.

(56) References Cited

U.S. PATENT DOCUMENTS

| | | | |
|---|---|---|---|
| 5,960,189 A | 9/1999 | Stupek et al. | |
| 6,202,206 B1 | 3/2001 | Dean et al. | |
| 6,957,433 B2 * | 10/2005 | Umberger et al. | 718/103 |
| 7,020,706 B2 | 3/2006 | Cates et al. | |
| 7,188,343 B2 | 3/2007 | Sanchez et al. | |
| 7,249,174 B2 | 7/2007 | Srinivasa et al. | |
| 7,509,671 B1 * | 3/2009 | Bedell et al. | 726/6 |
| 7,949,736 B2 * | 5/2011 | Reyes et al. | 709/222 |
| 7,979,859 B2 * | 7/2011 | Li et al. | 718/102 |
| 2002/0083118 A1 * | 6/2002 | Sim | 709/105 |
| 2004/0160900 A1 | 8/2004 | Lund et al. | |
| 2005/0132325 A1 | 6/2005 | Unbehagen | |
| 2005/0262503 A1 | 11/2005 | Kane | |
| 2007/0234345 A1 | 10/2007 | Kramer et al. | |
| 2007/0300228 A1 * | 12/2007 | White et al. | 718/102 |
| 2008/0127178 A1 * | 5/2008 | Smith et al. | 717/175 |
| 2009/0293062 A1 * | 11/2009 | Amir et al. | 718/104 |

OTHER PUBLICATIONS

Roggen,"Deploying Windows Server 2008: Initial Configuration Tasks", 2007, pp. 1-5.
"Multiple Server Installation Overview", pp. 1-4.

* cited by examiner

*Primary Examiner* — Emerson Puente
*Assistant Examiner* — Gregory Kessler
(74) *Attorney, Agent, or Firm* — Russell S. Krajec; Krajec Patent Offices, LLC (57) ABSTRACT

An installation and configuration system consolidates workloads of multiple applications and services, including applications or services that may be installed or configured on multiple server devices or remotely hosted services. The system gathers environmental information, analyzes dependencies among the workloads, and populates the input data used by the workloads from a common database. The system then executes the workloads, allowing branching within the workloads or the sequence of workloads. An example of branching may include detecting an error condition, pausing the sequence, and presenting alternative fixes to a user.

12 Claims, 5 Drawing Sheets

ENVIRONMENT WIDE CONFIGURATION SYSTEM

BACKGROUND

Installation and configuration of computer applications and services can be a time consuming and complex task. The complexity may be dramatically increased when multiple applications and services are installed, especially when some of the applications and services interact with each other or when the applications and services operate across a local or wide area network.

SUMMARY

An installation and configuration system consolidates workloads of multiple applications and services, including applications or services that may be installed or configured on multiple server devices or remotely hosted services. The system gathers environmental information, analyzes dependencies among the workloads, and populates the input data used by the workloads from a common database. The system then executes the workloads, allowing branching within the workloads or the sequence of workloads. An example of branching may include detecting an error condition, pausing the sequence, and presenting alternative fixes to a user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

An installation system may cause multiple workloads to be executed. The workloads may perform various functions, such as installing and configuring software and hardware components on a local device, another device connected through a network, and various remote devices. The installation system may coordinate or schedule the workloads and the tasks within the workloads based on dependencies, as well as populate the tasks with input parameters which may be obtained before execution or determined as a result of other tasks.

The installation system may gather workloads from multiple sources for execution. The workloads may be defined using a schema such that workloads from different sources may all be properly executed. In many embodiments, a workload may consist of multiple tasks that may be executed or caused to be executed. Each of the tasks may be defined according to a schema. The workloads may define the installation and configuration of various software and hardware components, but may be managed through the installation system.

The installation system may share common input values across multiple workloads. When a user inputs a value, for example, the value may be used in two or more workloads automatically. In some cases, one task within a workload may generate a result value that may be used by another task in the same or different workload. Such a result may be stored, along with the user input values, in a status database.

The status database may persist and may be used by subsequent installation operations. By referring to the status database first, a user may not have to re-enter values for services, applications, or other components that are installed at a later date.

In many embodiments, the status database may be at least partially populated by an environmental scanner. The environmental scanner may scan a local system for hardware and software information, as well as other clients and servers within a local area network and servers and remotely hosted services available through the Internet or other wide area network.

An error resolution database may be used when a task within a workload returns an error. The error resolution database may have various algorithms or mechanisms for identifying one or more options that may address the error. The options may be presented to a user for selection, or may be executed without the user input.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1:
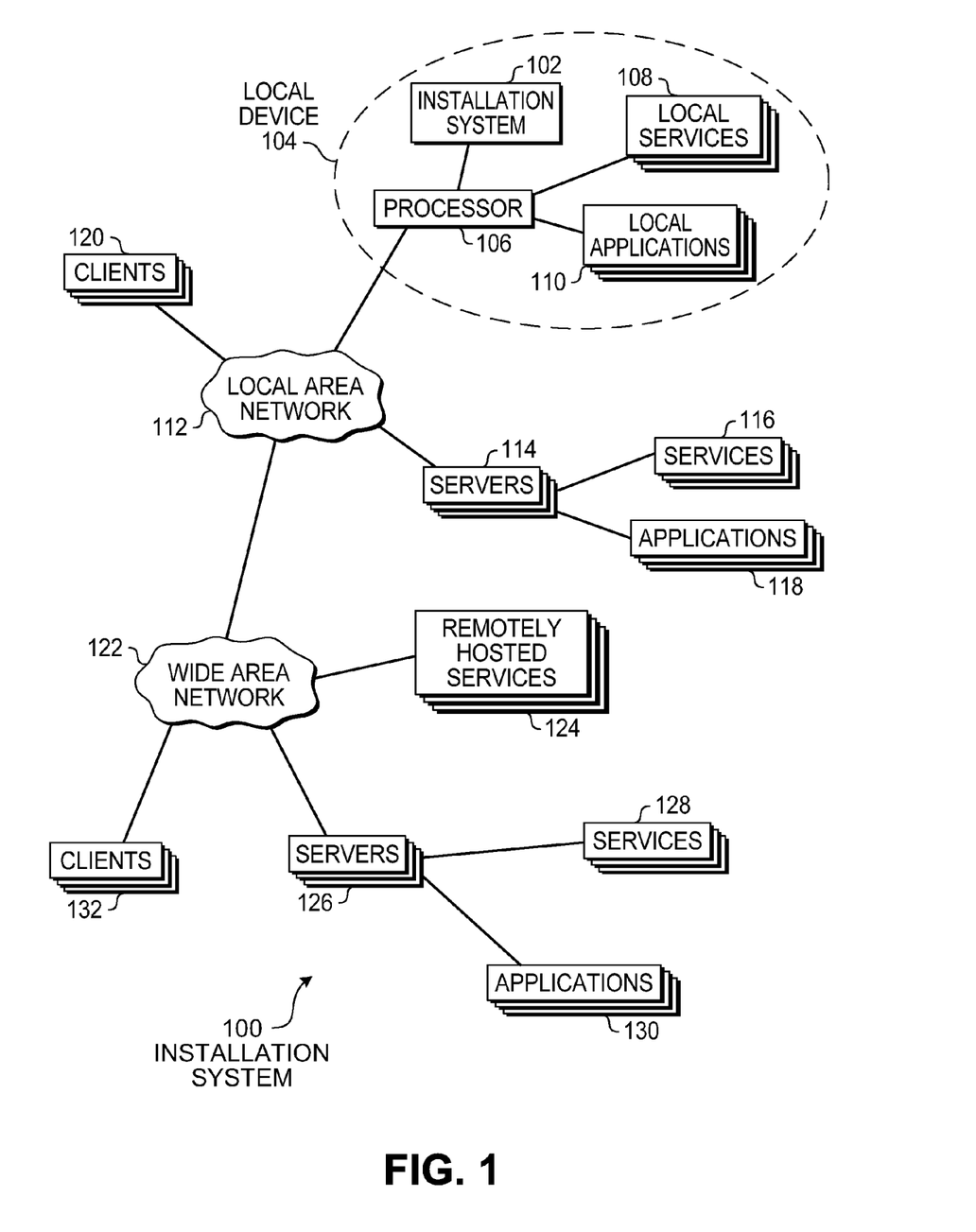
FIG. 1 is a diagram illustration of an embodiment showing an installation system and the context in which the installation system may operate.

FIG. 1 is a diagram of an embodiment 100 showing an installation system. Embodiment 100 is a simplified example of an installation system that may be used to install and configure various components on a local system, systems connected through a local area network, and systems available through a wide area network.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 is an example of an installation system that may manage installation of multiple components over multiple devices. The installation system may gather several workloads, each workload defining an installation or configuration for a particular component. The installation system may coordinate the workloads and cause each workload to be performed in sequence. The installation system may also have a status database in which input parameters for the workloads may be stored.

The installation system 102 may operate on a local device 104. A processor 106 may execute the installation system 102, and may cause various local services 108 and local applications 110 to be installed and configured.

The installation system 102 may also install and configure components across a network, including a local area network 112. Various servers 114 may have multiple services 116 and applications 118 that may be installed and configured. In some embodiments, the installation system 102 may be used to install and configure components on client devices 120.

The installation system 102 may be used to install and configure components across a wide area network 122. The components may include remotely hosted services 124, as well as services 128 and applications 130 that are operable on remote servers 126. The installation system 102 may also install and configure components on remote clients 132 in some cases.

A component that may be installed and configured may include software applications, hardware components, software services, and other configurable components.

For the purposes of this specification, a service may be a mechanism to enable access to one or more capabilities, where the access is provided using a prescribed interface and is exercised consistent with constraints and policies as specified in a service description.

For the purposes of this specification, an application may be a software program or group of software elements that may be used to perform a task that a user wishes to perform. The technical differences between a service and an application are blurry, as some software components may be considered a service when accessed using a browser or another software interface, and the same software component may be considered an application when the component is accessed through a user interface generated by the component. For the purposes of this specification, any reference to a service or application may be considered to include any application, service, or other configurable component, including configurable software, firmware, and hardware components.

The installation system 102 may manage workloads defining an installation or configuration of a component. Each workload may be defined using one or more tasks. A task may be a step within the workload, and many tasks may have specific input parameters and may generate various results.

The input parameters for a task may include information that is solicited from a user interface and provided by a user. In such a case, the installation system 102 may identify those input parameters and may present the input parameters on a user interface and store the values received.

In many embodiments, the installation system 102 may gather many of the input parameters and perform a user interface query for those parameters prior to causing the workloads to be executed. In other cases, the installation system 102 may perform a user interface query for parameters as those parameters are used during workload execution.

When the user interface queries are performed prior to causing the workloads to be executed, the installation system 102 may allow many parameters to be collected prior to launching the workloads. Such an embodiment may be useful when the workloads may take a long time to process. In some instances, installation and configuration operations may take many minutes or even hours to complete. By requesting the input parameters initially, a user may enter the data to be used and allow the installation system 102 to run for a long time without user interaction.

In many embodiments, some workloads may depend on other workloads. For example, the output of one workload may use the results of another workload. In another example, one application or service may use another application or service or may be configured to interoperate with the other application or service. In some cases, the installation system 102 may be able to detect which workloads depend on other workloads. In some cases, a user may indicate dependencies between workloads prior to executing the workloads.

Embodiment 100 is an example of the devices and components that may be affected by the installation system 102. The installation system 102 may act as a centralized mechanism for installing and configuring multiple components over multiple devices. When the installation of such components are centralized, the components may be scheduled based on their dependencies and their installation may be coordinated with respect to the dependencies. Further, information used by multiple components may be shared across the components so that the information is consistent and may be entered once.

The installation system 102 may be used by an administrator to administer installation of services on other devices, including services and applications on server devices as well as client devices. The administrator may manage the configuration of multiple components from a single location and using a single interface, and cause the configuration to occur on other devices, including servers and clients.

In some embodiments, the installation system 102 may operate as a remotely hosted service and may be used to manage the installation and configuration of devices within a local area network. In such an embodiment, the installation system 102 may have a web-based user interface so that an administrator may direct the operation of the installation system 102 with regard to various local client devices.

Figure 2:
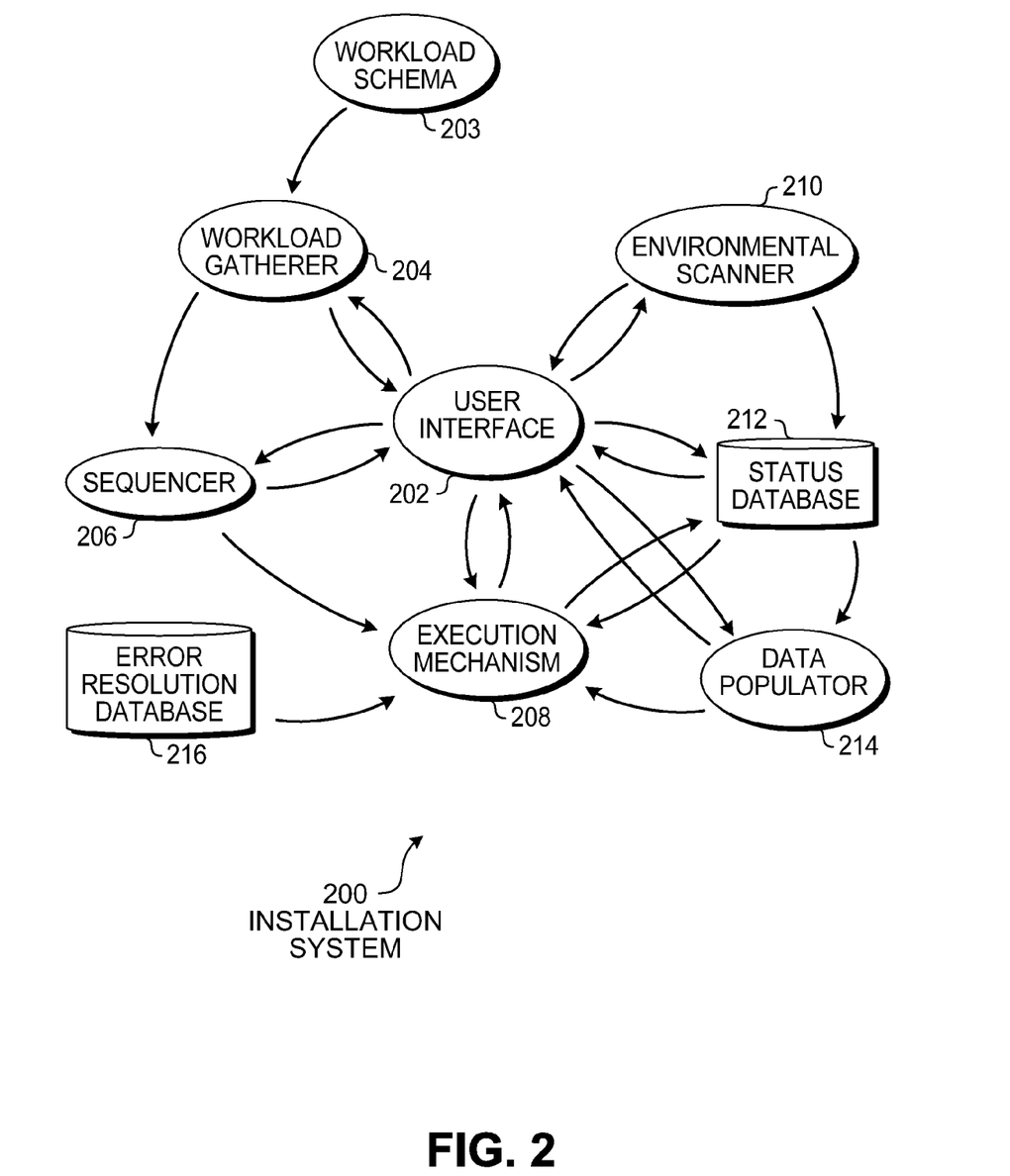
FIG. 2 is a diagram illustration of an embodiment showing the functional components that may make up an installation system.

FIG. 2 is a diagram of an embodiment 200 showing an installation system. Embodiment 200 is a simplified example of the functional elements of a workload based installation system that may be used to install and configure various components on a local system, systems connected through a local area network, and systems available through a wide area network.

The diagram of FIG. 2 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 is an example of the functional elements that may make up an installation system such as installation system illustrated in embodiment 100. In some embodiments, one or more of the functional elements described may operate on a local device, while other functional elements may operate on different devices, including local servers or remotely hosted services.

Embodiment 200 has a user interface 202 through which a user, such as an administrator, may cause various installation and configuration operations to occur. A typical user interface 202 may be a window on a computer display that may display various information, solicit input, and give status to the user. The user may have various devices such as keyboards, pointing devices, and other indicators to input information to the user interface. In a local console mode, the user interface 202 may be on a console interface to a device that implements the embodiment 200. In a remote or browser mode, the user interface 202 may be accessed using a web browser or other browser software from a remote computer. Other embodiments may have different mechanisms for implementing a user interface 202.

In some embodiments, user input data may be provided as pre-formatted data, such as an XML file for example. In some cases, user input data may be captured and stored as part of a planning activity as well.

The user interface 202 may be used by a user to direct the operation of other elements of the installation system. For example, the user interface 202 may be used to cause a workload gatherer 204 to identify various workloads to operate.

The workload gatherer 204 may gather various workloads together prior to execution of the workloads. In many systems, a workload may be defined for the installation or configuration of a single component, such as a hardware device, software application, or service. The workload may comprise multiple tasks, and each task may have various input parameters and may generate results.

The workloads may conform to a workload schema 203. The workload schema 203 may define a common mechanism for identifying, classifying, and executing various workloads. The workload schema 203 may enable workloads developed by different software or hardware manufacturers to be managed and executed by the installation system of embodiment 200. An example workload schema is included later in this specification.

In some embodiments, complex installations of a single component may be broken down into multiple workloads. Such an embodiment may be useful for cases where multiple components have interdependencies. For example, a first service may be partially installed using a first workload, then an application that interacts with the service may be installed using a second workload. Finally, a third workload may finalize the configuration of the first service using configuration results from the application installation.

In some embodiments, the workload gatherer 204 may identify workloads that have already been completed or workloads that have been partially completed. Completed workloads may be useful for identifying results that may be used by other workloads. For example, a widely used service, such as a messaging service, may have configuration parameters that are used by many other applications. By identifying the completed configuration workload for the messaging service, the workload gatherer 204 may identify some input parameters that may be used by subsequent workloads for related applications.

In some cases, a workload may have been started but not successfully completed. The workload gatherer 204 may identify those workloads and may present the partially completed workloads in the user interface 202. A user may be able to select one or more of the partially completed workloads for execution.

After workloads are identified for execution, the sequencer 206 may organize the workloads and tasks within those workloads in sequential order. In many embodiments, the input parameters for one workload may be the results of another workload. Other dependencies may be defined within the workload or through an external database that may have dependency definitions.

The sequencer 206 may create a sequence of workloads to execute. In many embodiments, the sequence may be a linear sequence. In other embodiments, the sequence may include portions where two or more workloads may be executed in parallel.

Some embodiments may generate sequences based on individual tasks within the workloads. In such a case, the sequencer 206 may generate a sequence of tasks, and the tasks from one workload may be interspersed with tasks from other workloads. For example, during the installation of two services that are highly interdependent, a first task may be performed for the first service, a second task performed for the second service, a third task performed for the first service, and a fourth task performed for the second service.

Prior to executing the various workloads and tasks, the input parameters for the tasks may be identified and populated by a data populator 214. Input parameters may be populated by an environmental scanner 210 that may scan the local hardware and software, as well as the hardware and software from other devices connected through a local area network or a wide area network such as the Internet. The environmental scanner 210 may determine an inventory of hardware, software, and other components and populate a status database 212 that may in turn be used to populate the input parameters for the various tasks.

In some embodiments, the environmental scanner 210 may be used to verify or validate data provided by a user. Such an embodiment may be when the environmental scanner 210 is operated after a user inputs data. In another embodiment, the environmental scanner 210 may be used to populate data fields before a user inputs data. In such an embodiment, a user may be able to modify or change the data collected by the environmental scanner 210.

For those input parameters that are not available through the status database 212 or for which a result of another task is not available, the data populator 214 may query the input parameters to the user through the user interface 202 and the values stored in the status database 212.

In many embodiments, such input parameters may be queried prior to beginning execution of the tasks. By consolidating the queries, an administrator may enter the data prior in a short session prior to launching a time consuming installation sequence. In some embodiments, an installation sequence may take several hours to complete.

In some embodiments, some input parameters may be queried at various stages during the execution of the workloads.

After the sequencer 206 has determined the sequence, the execution mechanism 208 may cause the various tasks to be executed. The tasks may be executed using any mechanism.

In some cases, a task may be executed by causing a short executable program to be run. In other cases, execution mechanism may have an environment capable of executing scripts, communicating with different applications, or performing other activities that perform the operations of a task.

During task execution, an error resolution database 216 may be employed to identify and correct problems that may occur. The error resolution database 216 may contain rules, logic, or other information that may be used to identify corrective or remedial action that may be taken when a specific error occurs. For example, an error may be detected and one or more options for resolving the condition may be identified through the error resolution database 216. One or more options may be identified that may resolve the condition. In some cases, the sequence may be paused and one or more options presented to a user. In other cases, the resolution of the condition may be identified and automatically executed without user interaction.

Figure 3:
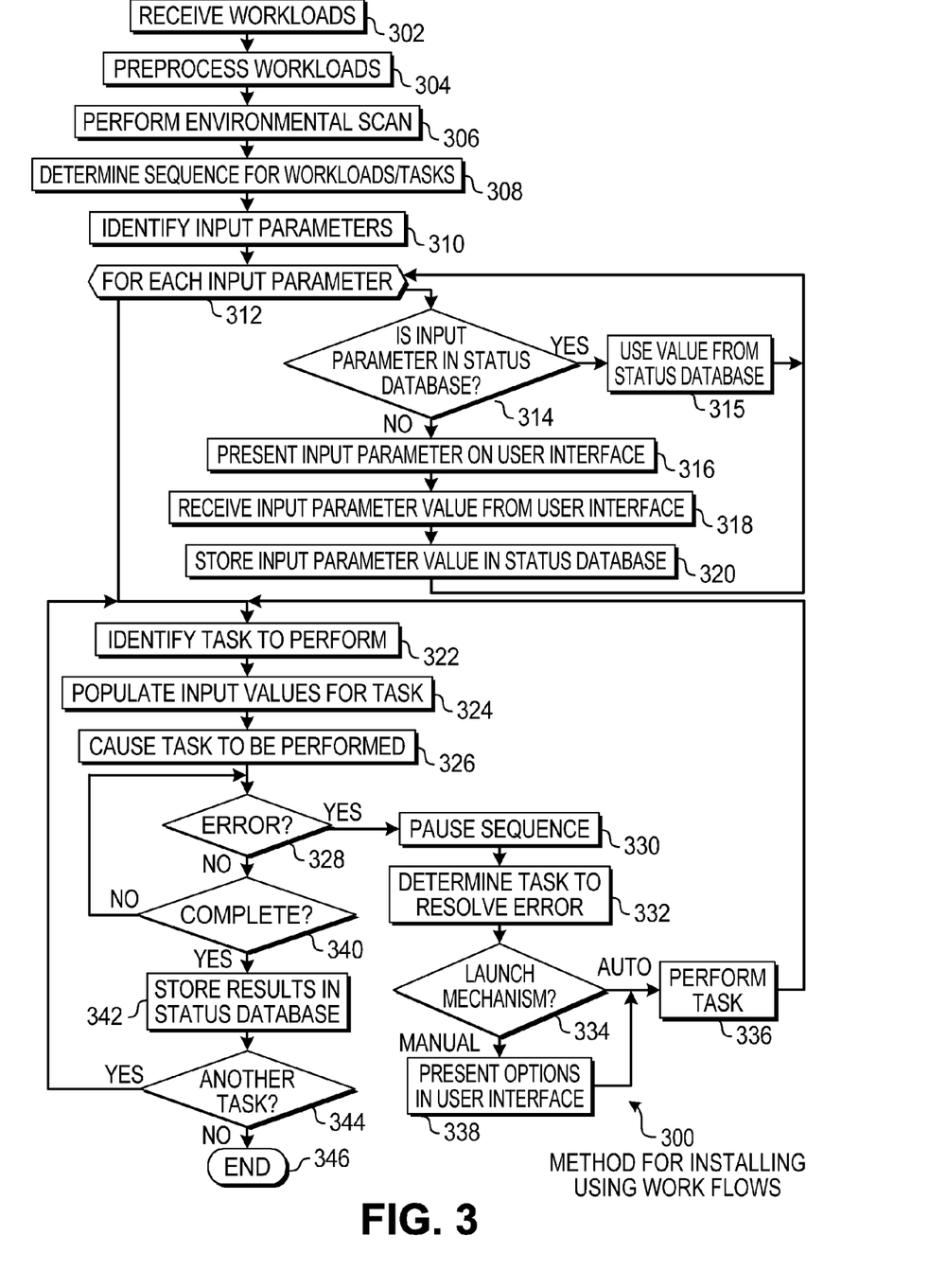
FIG. 3 is a flowchart illustration of an embodiment showing a method for installation using workflows.

FIG. 3 is a flowchart illustration of an embodiment 300 showing a method for installing and configuring components using workflows. Embodiment 300 is a simplified example of the operation of an installation system such as the installation system of embodiment 200.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates a method for gathering workloads, preprocessing workloads, and causing the workloads to be executed. The workloads may be defined for any application. In many embodiments, the workloads may be used to install and configure software services and applications, as well as configurable hardware components.

Workloads may be received in block 302. In many embodiments, the workloads may comprise multiple tasks. Each task may have various input parameters, may generate various results, and may have dependencies on other tasks. The workloads may be received through various mechanisms.

The workloads may be selected using many different methods. In some cases, a user interface may be used to select the specific workloads to perform. For example, a user may purchase a software or hardware component that may come with a workload or set of workloads. The user may select the workload and cause the workload to be executed by an installation system.

In some embodiments, a package of applications and services may be supplied with various workloads. For example, a business server system may have several workloads that may install and configure basic operating system components, then install services such as email messaging applications across multiple servers and install client applications on various client devices. Such a system may be installed with a large group of workloads.

In some cases, different sets of workloads may be included in a software system. For example, the business server example above may be shipped with one set of workloads for installing the components on a single server and a second set of workloads for installing the various components on a dual server configuration.

The workloads may be preprocessed in block 304. A detailed explanation of a preprocessing method may be found in FIG. 4 of this specification. In general, a preprocessing method may analyze tasks within the workloads to discover input parameters, output results, and dependencies on other tasks.

After preprocessing in block 304, an environmental scan may be performed in block 306. A detailed explanation of an environmental scan may be found in FIG. 5 of this specification. In general, an environmental scan may analyze hardware and software elements of a local system, systems connected through local area networks, and systems connected through wide area networks. The environmental scan may collect information that may be used as input parameters to the various tasks.

A sequence for the workloads and tasks is determined in block 308. In some embodiments, a sequence may be determined by linking dependent tasks or workloads in a sequence, then by defining a sequence that enables the result of one task to be used as an input parameter for another task.

In many embodiments, a sequence may be a linear sequence. Other embodiments may enable branching, parallel tasks, and other complex sequences.

After determining a sequence of tasks in block 308, input parameters may be identified in block 310. The input parameters in block 310 may be any input parameter for which the environmental scan of block 306 has not generated a value.

For each input parameter in block 312, if the input parameter is in the status database in block 314, the value from the status database may be used in block 315. In many embodiments, the environmental scan of block 306 may populate the status database. In some embodiments, the status database may be persisted from one installation operation to another, allowing the user input values and results from previous workloads to be reused.

If the input parameter is not in the status database in block 314, the input parameter may be presented in a user interface in block 316, a value received from the user interface in block 318, and the value stored in the status database in block 320.

In some cases, a result from one workload or task may be used as an input parameter for another task that may be later in the sequence. In such a case, an input parameter may be linked to a reference in the status database that may be populated by a workload or task that has yet to be performed.

After processing all of the input parameters in block 312, a task to be performed may be identified in block 322. The input values for the task may be populated in block 324 from the status database, and the task may be caused to be performed in block 326.

If an error is detected in block 328, the sequence may be paused in block 330 and a task may be determined in block 332 that may address the error. The task in block 332 may be determined from an error resolution database or from logic defined within the workload, or from some other source.

After the task is determined in block 332, if the launch mechanism in block 334 is automatic, the task may be performed in block 336. In the case of an automatic launch, the user may not be queried, as in a manual launch of block 334, where the options may be presented in a user interface in block 338. In the case of a manual launch, the sequence may be paused until the user has an opportunity to approve the task or select between multiple tasks.

In some embodiments, the automatic or manual launch information of block 334 may be determined from an error resolution database. In other embodiments, such information may be a default setting of the installation system.

If the task is not complete in block 340, the process may return to block 328. If the task is complete in block 340, the results may be stored in the status database in block 342. The results stored in block 342 may be made available to future tasks in the currently executing set of workloads or in future workloads.

If another task is to be performed in block 344, the process may return to block 322. Otherwise, the process may end in block 346.

Embodiment 300 illustrates the execution of a sequence of tasks that may be performed in a linear sequence. Other embodiments may enable parallel execution of various tasks.

Figure 4:
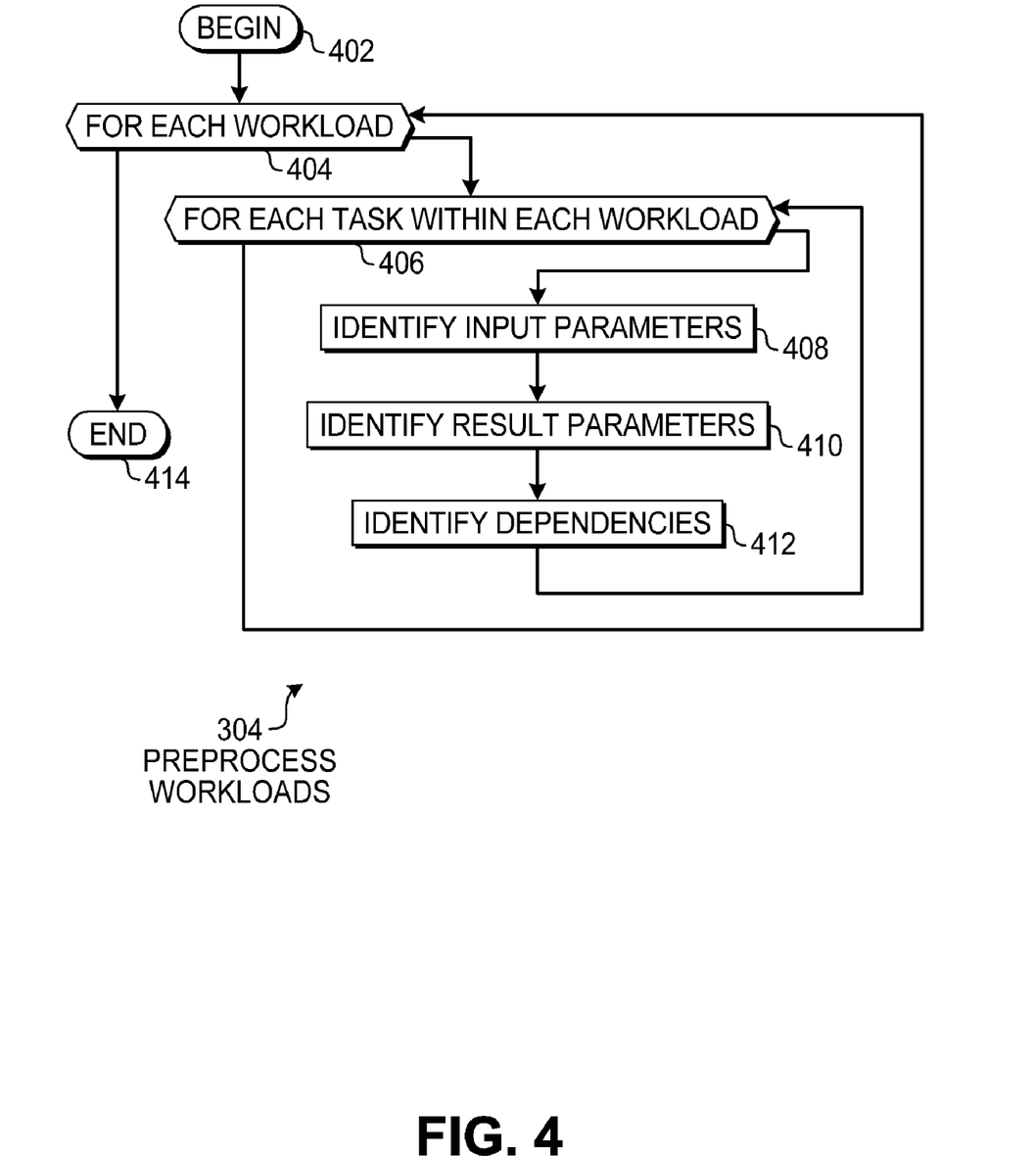
FIG. 4 is a flowchart illustration of an embodiment showing a method for preprocessing workloads.

FIG. 4 is a flowchart illustration of an embodiment of a method to perform the preprocessing of workloads as in block 304 of embodiment 300.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Block 304 may be performed by beginning in block 402. For each workload in block 404, and for each task within each workload in block 406, the following analysis may be performed. Any input parameters to the task may be identified in block 408. Any result parameters may be identified in block 410, and any dependencies may be identified in block 412. The process may end in block 414.

The process of block 304 may identify those elements of a task that may be used for linking two or more tasks together in sequence, as well as identifying those items that may be collected from an environmental scan or from a user interface query.

Figure 5:
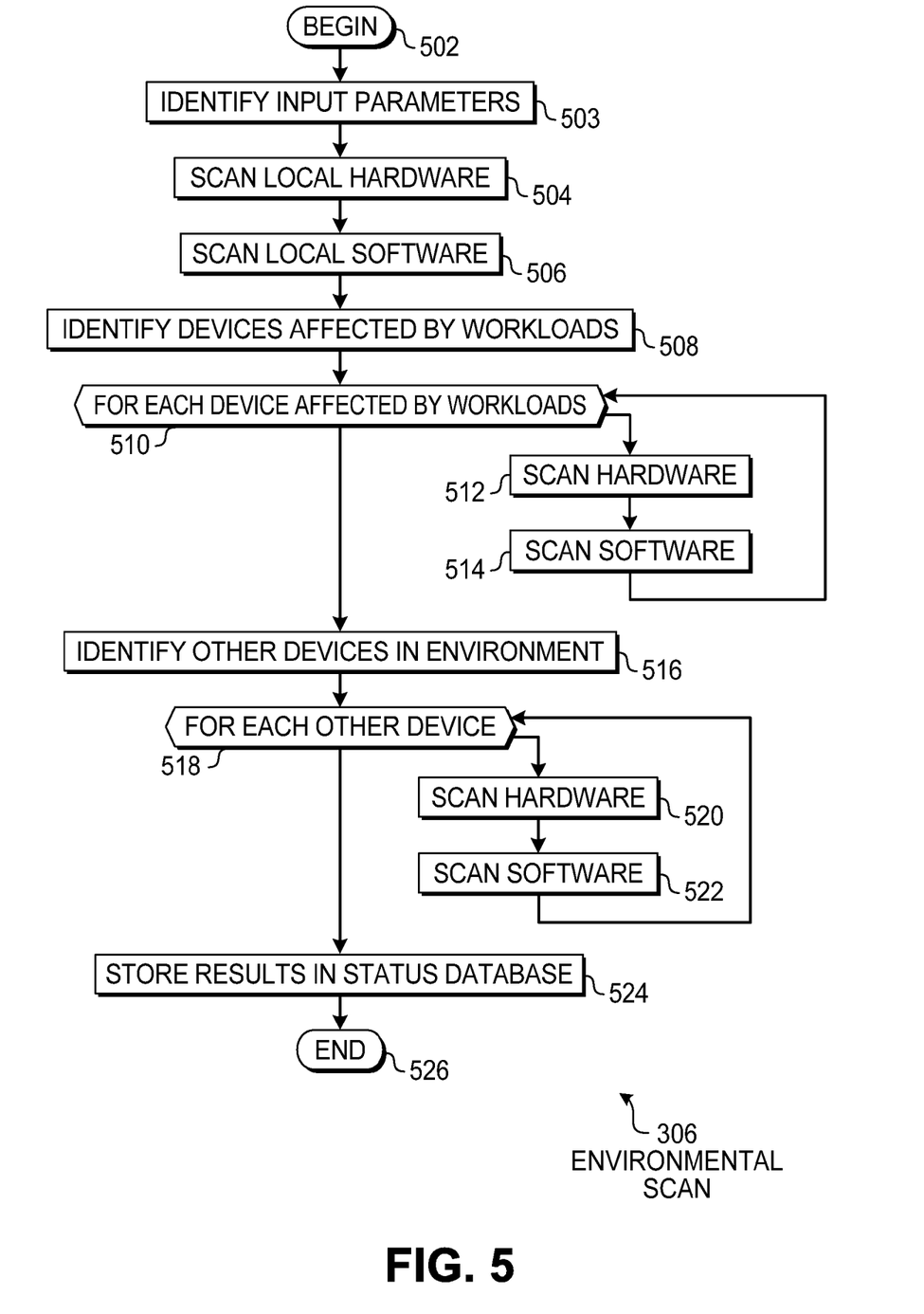
FIG. 5 is a flowchart illustration of an embodiment showing a method for performing an environmental scan.

FIG. 5 is a flowchart illustration of an embodiment of a method to perform the preprocessing of workloads as in block 306 of embodiment 300.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Block 306 may be performed by beginning in block 502.

Input parameters that may be searched may be identified in block 503. The input parameters of block 503 may be the aggregated input parameters from all of the workloads to be performed. In some cases, the input parameters in block 503 may be filtered to include a subset of parameters likely to be found through an environmental scan.

The local hardware may be scanned in block 504 and the local software may be scanned in block 506.

Devices affected by the various workloads may be identified in block 508. The devices affected by the workloads may be any device on which a workload will install or configure a component, or a device on which one or more tasks within a workload may depend.

For each of those devices in block 510, the hardware may be scanned in block 512 and the software scanned in block 514.

Other devices may be identified in block 516. The other devices may include various devices that make up the information technology infrastructure or general computing environment. These devices may not be directly affected by a task in the workload, but may contribute to the overall infrastructure that may affect one or more tasks. Examples may include servers that provide underlying network functions such as DHCP or DNS services, network gateways and routers, or any other device.

For each of those devices in block 518, the hardware may be scanned in block 520 and the software scanned in block 522.

The results of the scans may be stored in the status database in block 524.

The process may end in block 526.

The scanning of hardware and software in block 306 may include any type of queries, data collection, instrumentation, exercising, or other mechanism that may be used to determine an input parameter for a task. In many cases, two or more values from different sources may be combined to deduce, calculate, or otherwise determine a particular input parameter value.

An example of a schema that may be used for defining tasks within a workload is illustrated in Table 1.

TABLE 1

Schema Example for Tasks

| Element | Explanation |
|---|---|
| TaskID | An identifier, such as a GUID |
| Task title | Descriptive title |
| Task sequence | Defines sequencing (after TaskID or before TaskID) |
| Task dependencies | Defines dependencies on other tasks |
| Task type | Tool type, such as a wizard or script |

TABLE 1-continued

Schema Example for Tasks

| Element | Explanation |
|---|---|
| Task status | List of possible status (e.g., Complete, To Do, pending {TaskID}, etc. |
| Step | Number of repetitions of the task |
| Action link | Link to executable file, script, or documentation |
| Timestamp | Date and time task marked as complete |

Table 1 represents a subset of elements that may be used in a typical schema for defining tasks.

Each task may have an identifier, such as a GUID, and a descriptive title. The identifier may be used by an installation system to track tasks and to relate one task with another.

The task sequence may define the sequencing to respect to other tasks within the same workload, or to other tasks within other workloads. The task sequence may be used to define that a particular task is to be performed before another task or after another task.

The task dependencies may define additional dependencies on other tasks but may not specify a sequence of execution.

The task type may be used to identify different types of tasks. Some tasks may be a wizard that collects information from a user, while other tasks may execute a script, for example.

The task status may define which status options may be assigned to the task. Some tasks may be able to have only a subset of statuses assigned.

The step definition may define the number of times a task may be repeated.

The action link may identify an executable file, script, documentation, or other external file that is related to the task. In many cases, the action performed by the task may be defined by the action link.

The timestamp may store the date and time a task has been marked as completed.

The schema of Table 1 is merely one example of a schema that may be applied to a workload driven installation process.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
   receiving a plurality of workloads, each of said workloads comprising at least one task, said task comprising a task definition conforming to a task schema;
   for at least one of said workloads, identifying at least one input parameter to said workload;
   for at least one of said workloads, identifying at least one dependency to another of said workloads;
   performing an environmental scan to determine a value for said at least one input parameter;
   determining a sequence of said tasks based at least in part on said dependencies;
   causing said tasks to be performed according to said sequence;
   obtaining at least one of said input parameters from a status database, said status database being populated at least in part by user input;
   determining a first input parameter value from a result of a first task and storing said first input parameter value in said status database;
   determining that said result is an input parameter to a second task, said second task being later in said sequence to said first task; and
   using said first input parameter value as said input parameter to said second task.

2. The method of claim 1 further comprising:
   determining that an error has occurred in a first task;
   pausing at least a portion of said sequence; and
   determining a corrective action that may be performed in response to said error.

3. The method of claim 2 further comprising:
   presenting an option for said corrective action on a user interface, said corrective action to be performed after receiving a user input from said user interface.

4. The method of claim 2 further comprising:
   causing said corrective action to be performed without user interaction.

5. The method of claim 1, said environment scan comprising:
   taking at least a partial inventory of locally installed applications.

6. The method of claim 1, said environment scan comprising:
   taking at least a partial inventory of locally executing services.

7. The method of claim 1, said environment scan comprising:
   taking at least a partial inventory of services available across a network.

8. The method of claim 1, said environment scan comprising:
   determining at least one parameter from a remotely hosted service.

9. The method of claim 1, at least one of said workloads comprising configuration of a remotely hosted service.

10. The method of claim 1, at least one of said workloads comprising installation of an application on a remote device.

11. A system comprising:
    a processor;
    a workload gathering mechanism operating on said processor and configured to receive a plurality of workloads, each of said workload comprising at least one task;
    a sequencing mechanism configured to identify at least one dependency between a first workload and a second workload, and determine a sequence for said workloads using said at least one dependency;
    a data population mechanism configured to identify at least one input parameter for at least one of said workloads, and for each of said input parameters, determine a value and populate said input parameter with said value; and
    a task execution mechanism configured to cause each of said tasks to be performed based on said sequence;
    a user interface;
    a status database configured to store at least one value for at least one of said input parameters;

determine a value for a first input parameter as a result of causing a first task to be performed and store said value in said status database;
determine that a second task has said first input parameter; and
cause said first input parameter of said second task to use said value when said second task is performed.

12. The system of claim 11 further comprising:
a fault analysis system configured to receive an error from one of said tasks, determine a potential remedial action for said error, and present said error on a user interface.

* * * * *

UNITED STATES PATENT AND TRADEMARK OFFICE
CERTIFICATE OF CORRECTION

PATENT NO. : 8,151,273 B2  
APPLICATION NO. : 12/199847  
DATED : April 3, 2012  
INVENTOR(S) : Jeanine E. Spence et al.

Page 1 of 1

It is certified that error appears in the above-identified patent and that said Letters Patent is hereby corrected as shown below:

In column 12, line 61, in Claim 11, after "value;" delete "and".

Signed and Sealed this  
Twenty-fifth Day of December, 2012

David J. Kappos  
*Director of the United States Patent and Trademark Office*